(12) United States Patent
Park

(10) Patent No.: US 8,648,493 B2
(45) Date of Patent: Feb. 11, 2014

(54) COMPUTER SYSTEM HAVING SOLAR POWER UNIT AND METHOD OF CONTROLLING THE SAME

(75) Inventor: Jeong-gyu Park, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 421 days.

(21) Appl. No.: 12/852,580

(22) Filed: Aug. 9, 2010

(65) Prior Publication Data

US 2011/0140647 A1   Jun. 16, 2011

(30) Foreign Application Priority Data

Dec. 12, 2009   (KR) .................. 10-2009-0123632

(51) Int. Cl.
*H02J 3/32* (2006.01)
*H02J 7/00* (2006.01)

(52) U.S. Cl.
USPC .................. 307/46; 307/48; 307/65; 307/66; 320/101; 320/167

(58) Field of Classification Search
USPC .......... 320/101, 138, 167; 307/43–46, 48–50, 307/64–67
See application file for complete search history.

(56) References Cited

U.S. PATENT DOCUMENTS

| | | | |
|---|---|---|---|
| 6,339,311 B1 * | 1/2002 | Caldwell | 320/101 |
| 7,545,117 B2 * | 6/2009 | Kular et al. | 320/103 |
| 8,030,800 B1 * | 10/2011 | Terrell et al. | 307/64 |
| 8,058,752 B2 * | 11/2011 | Erickson et al. | 307/150 |
| 8,264,193 B2 * | 9/2012 | Kular et al. | 320/101 |

\* cited by examiner

*Primary Examiner* — Richard V Muralidar
(74) *Attorney, Agent, or Firm* — Cha & Reiter, LLC.

(57) ABSTRACT

A charging system for a mobile device such as a computer, and method of operating the same are disclosed. The computer is a system that includes: a system unit being provided with power output to an operation power supply terminal to carry out an operation; a battery unit outputting battery power to the operation power supply terminal; and a solar power unit being provided with feedback on a voltage of the operation power supply terminal and outputting solar power corresponding to a predetermined operational level of the system unit to the operation power supply terminal.

20 Claims, 9 Drawing Sheets

FIG. 5

| STATE CHANGE | SOLAR POWER UNIT | AC_IN# | Q1 | Q2 | $V_{DC}$ SOURCE |
|---|---|---|---|---|---|
| BATTERY MODE -> ADAPTOR INSERTION | Disable | Low->High | Off | Off | ADAPTOR POWER |
| BATTERY MODE -> ADAPTOR INSERTION | Disable | Low->High | Off | Off | ADAPTOR POWER |
| ADAPTOR MODE -> ADAPTOR DETACHMENT | Enable | High->Low | On | On | BATTERY + SOLAR CONVERTER |
| ADAPTOR MODE -> ADAPTOR DETACHMENT | Disable | High->Low | Off | On | BATTERY |

COMPUTER SYSTEM HAVING SOLAR POWER UNIT AND METHOD OF CONTROLLING THE SAME

CLAIM OF PRIORITY

This application claims the benefit of priority from Korean Patent Application No. 10-2009-0123632, filed on Dec. 12, 2009 in the Korean Intellectual Property Office, the disclosure of which is incorporated herein by reference in its entirety.

BACKGROUND OF THE INVENTION

1. Field of the Invention

The present invention relates to a computer system and a method of controlling battery power. More particularly, the present invention relates to a system and method for simultaneously discharging solar power and charging a system battery.

2. Description of the Related Art

Currently, a solar charging system applied to mobile devices, such as a laptop/notebook/pad computer, supplies power to an adaptor of the mobile device as a separate device. A solar panel having an area larger than the mobile device is typically used. Thus, such a charging system is physically spread out, due to limitations in energy conversion efficiency of a solar cell versus the area.

FIG. 1A illustrates an example of a solar charging system realized independently of a computer system.

The solar charging system 110 in FIG. 1A supplies power to a computer system 100 by discharging energy that has been charged within the charging system. In this example, a high capacity battery, such as high capacity lithium or nickel-cadmium batteries, is necessary to cover a load of the system with a high capacity. The solar charging system 110 serves to replace an alternating current (AC) adaptor until a charged high-capacity battery is entirely discharged.

FIG. 1B illustrates a solar charging system integrated with a computer system as a single unit.

Referring now to FIG. 1B, the solar charging system 120 is realized in a single unit on the rear side of a panel of the computer system 100. The solar charging system 120 uses a restricted charging process whereby a system battery is charged only when the computer system 100 is turned off. Thus, a user has limitations in using such solar charging system 120.

FIG. 2 illustrates a process of charging a system battery by a typical solar charging system.

When inserting an adaptor, a computer system 100 generally uses alternating current (AC) power input through the adaptor prior to using direct current (DC) power input from a battery.

The computer system 100 determines whether a solar battery cell is charged enough to replace AC power (S201) as the current power source. If the solar battery cell is not sufficiently charged enough to replace AC power at S201 (S201-N), the computer system 100 disables a change to a solar charging mode (S212) and returns the current charging mode.

However, if the solar battery cell is sufficiently charged so as to replace AC power (S201-Y), the computer system 100 determines whether it would be able to operate in the solar charging mode (S202). Specifically, in the case receiving an input of DC power instead of AC power, i.e., input with power through the battery instead of the AC adaptor, the computer system 100 can operate in the solar charging mode. If the computer system is not able to operate in the solar charging mode (S202-N), the computer system 100 disables a change to the solar charging mode (S212). If the computer 100 changes to the solar charging mode even if disabling a change to the solar charging mode, the computer system 100 may display a warning light informing of a danger that operability may fail.

However, if being able to operate in the solar charging mode (S202-Y), the computer system 100 enables charging of the system battery (S203). In this case, energy charged in the solar battery cell charges the system battery of the computer system 100 (S204). When the system battery is fully-charged, a charging process is completed.

In order to manage a high load of the computer system 100, a large area of a solar panel is used in order to be able to convert sufficient amounts of solar energy for powering the load. Moreover, in order that a solar pack loads the computer system 100 and re-charges the system battery for a certain amount time, an additional battery pack is needed to operate the computer concurrent with the recharging of the system battery. However, an additional large-size solar pack is inconvenient for a user to carry and may cause serious safety problems when connected to the computer system 100 with a larger capacity than a battery in the solar pack. In addition, the battery in the solar pack and a battery protection device/IC to control the same are necessary, thereby resulting in an increase in the manufacturing cost of the solar pack.

SUMMARY OF THE INVENTION

Accordingly, one or more exemplary embodiments provide a charging system for a mobile device such as a computer system which can discharge solar power simultaneously with battery power according to a load in the system, and charges the system and a battery while using the computer system, or under when the amount of solar energy is relatively small compared to the energy required, and a method of controlling the same.

The foregoing and/or other exemplary aspects may be achieved by providing a computer system including: a system unit being provided with power output to an operation power supply terminal to carry out an operation; a battery unit outputting battery power to the operation power supply terminal; and a solar power unit being provided with feedback on a voltage of the operation power supply terminal and outputting solar power corresponding to a predetermined operational level of the system unit to the operation power supply terminal.

According to an exemplary aspect of the present invention, the solar power unit can be enabled when the solar power is charged to at least a predetermined voltage.

According to another exemplary aspect of the present invention, the solar power unit may preferably include a capacitor charged with the solar power and a converter for selectively discharging the solar power charged in the capacitor.

According to another exemplary aspect of the present invention, the computer system may further preferably include a controller for controlling at least one of the battery unit and/or the solar power unit to output the battery power and/or the solar power to the operation power supply terminal.

According to yet another exemplary aspect of the present invention, the solar power unit may preferably include a first transistor, and the controller may control a converter to turn on the first transistor when AC power is not being input from an adaptor and the solar power unit is enabled, and the controller may control the converter to turn off the first transistor when AC power is being input by the adaptor.

According to still another exemplary aspect of the present invention, the battery unit may preferably include a second transistor, and the controller may turn on the second transistor when AC power is not being input from an adaptor, and the controller may turn off the second transistor when AC power is being input from the adaptor.

According to even another exemplary aspect of the present invention, the controller may be provided with power from the solar power unit and the battery unit, respectively, according to a predetermined ratio.

The solar power unit can be detachable from the computer system.

Moreover, the battery unit can be mounted in or detachable from the computer system.

Another exemplary aspect of the present invention may be achieved by providing a method of controlling a computer system including: outputting battery power to an operation power supply terminal; being provided with feedback on a voltage of the operation power supply terminal and outputting solar power corresponding to a predetermined operational level of a system unit to the operation power supply terminal; and being provided with power output to the operation power supply terminal to carryout an operation.

The method according to the present invention may further include outputting the solar power corresponding at the predetermined operational level of the system unit to the operation power supply terminal when the solar power is charged by at least a predetermined voltage value.

The method according to the present invention may further include charging the solar power unit and selectively discharging the charged solar power unit.

The method according to the present invention may further include outputting the battery power and/or the solar power to the operation power supply terminal.

The method according to the present invention may further include outputting the solar power to the operation power supply terminal when AC power is not being input from an adaptor and the solar power is charged to at a predetermined voltage or more, and not outputting the solar power to the operation power supply terminal when AC power is being input from the adaptor.

The method according to the present invention may further include outputting the battery power to the operation power supply terminal when AC power is not being input from an adaptor, and not outputting the battery power to the operation power supply terminal when AC power is being input from the adaptor.

The method according to the present invention may further include being provided with the solar power and the battery power, respectively, according to a predetermined ratio.

The solar power can be input from the solar power unit, which is preferably detachable from the computer system.

The battery power may be input from the battery unit which is mountable in, and/or detachable from the computer system.

BRIEF DESCRIPTION OF THE DRAWINGS

The above and/or other exemplary aspects will become apparent and more readily appreciated by a person of ordinary skill in the art from the following description of the exemplary embodiments, taken in conjunction with the accompanying drawings, in which:

FIG. 5 illustrates an operation of supplying power according to changes in the state of the computer system according to the exemplary embodiment of the present invention.

DETAILED DESCRIPTION

Figure 1A:
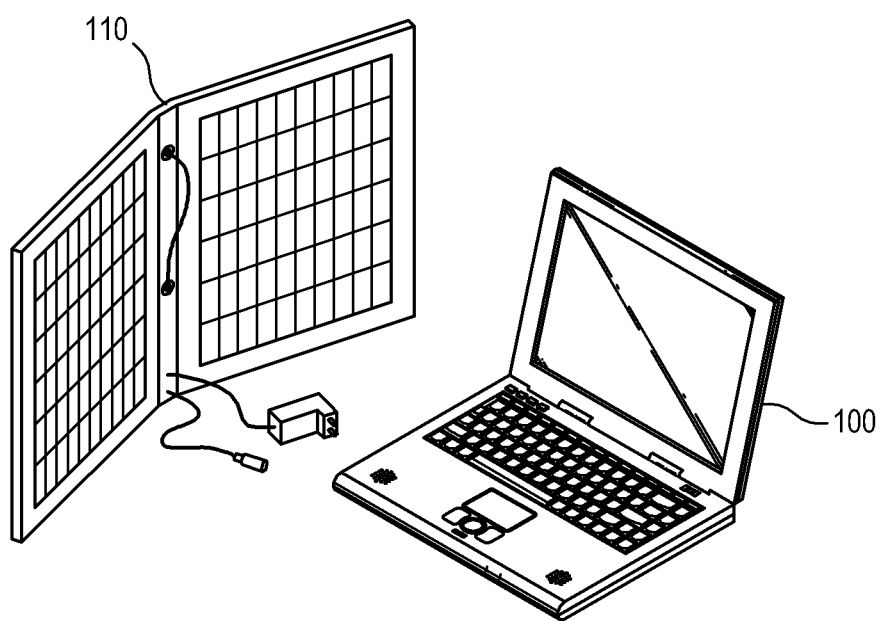
FIG. 1A illustrates a solar charging system realized independently of a computer system.
Figure 1B:
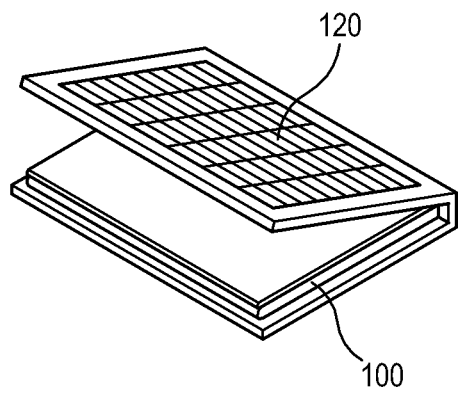
FIG. 1B illustrates a solar charging system integrated in a single unit with a computer system.
Figure 2:
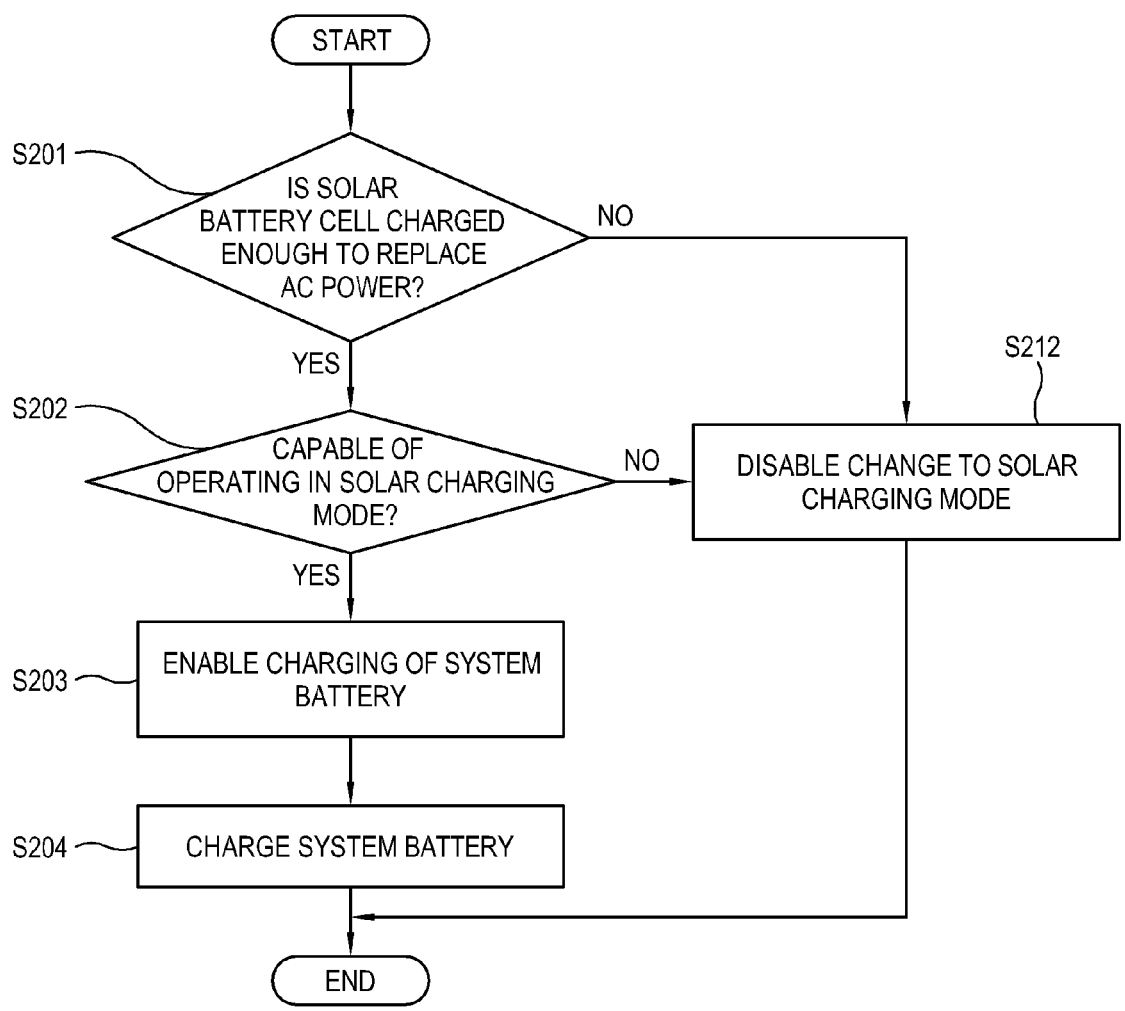
FIG. 2 illustrates a process of charging a system battery of a computer or other device by a general solar charging system.

Below, exemplary embodiments will now be described in detail with reference to accompanying drawings so as to be easily realized by a person having ordinary knowledge in the art. The exemplary embodiments herein of the presently claimed invention may be actually embodied in a various amount of forms without being limited to the examples shown and described herein. Descriptions of well-known structures and functions may be omitted for clarity when their inclusion could obscure appreciation of the subject matter of the present invention by a person of ordinary skill in the art, and like reference numerals refer to like elements throughout.

Figure 3:
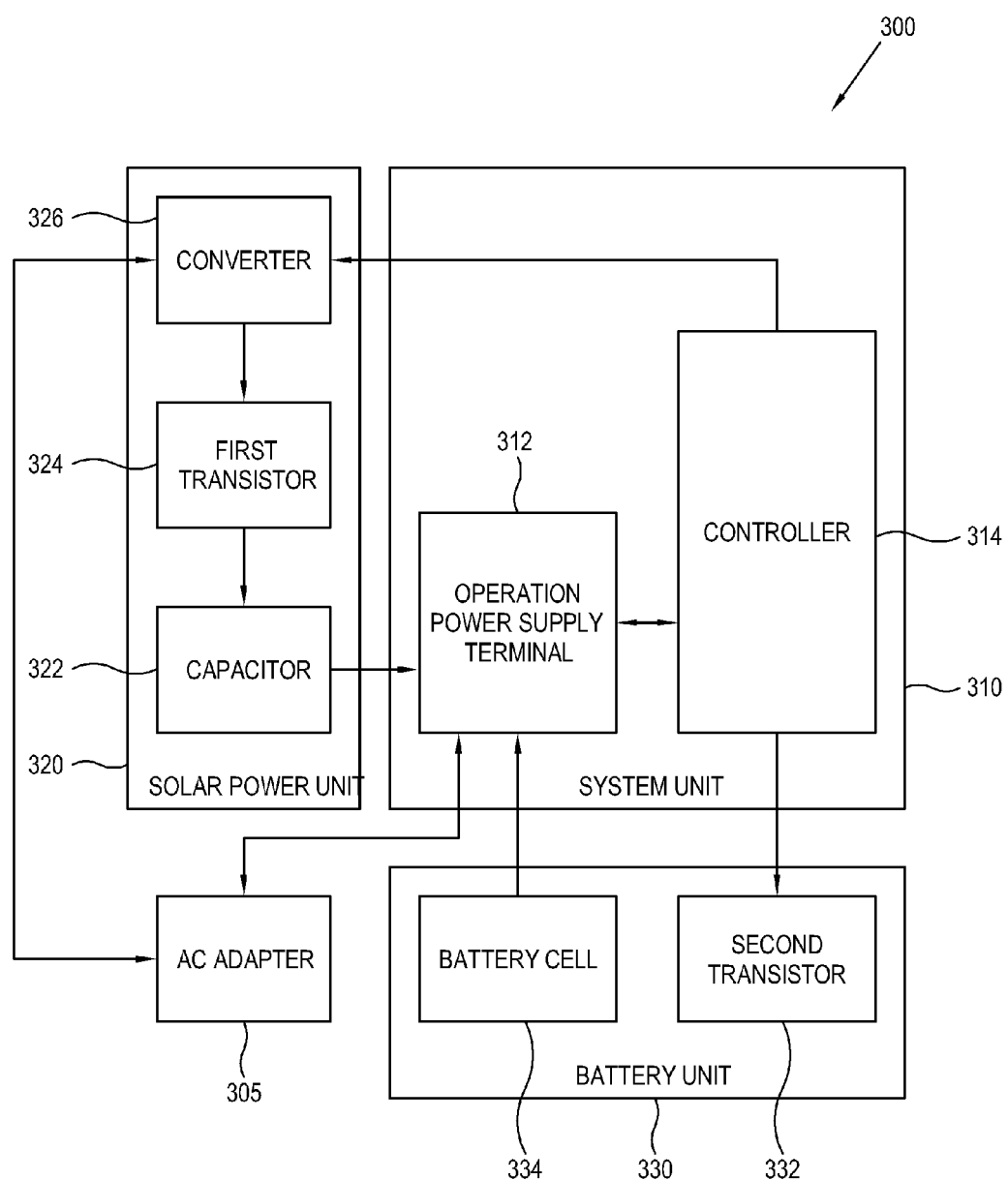
FIG. 3 is a block diagram illustrating a configuration of a computer system having solar power unit according to an exemplary embodiment of the present invention.

FIG. 3 is a block diagram illustrating a configuration of a computer system 300 according to a first exemplary embodiment of the present invention.

The computer system 300 according to the exemplary embodiment of the present invention may be a laptop computer, a mobile computer, or any other type of electronic device, preferably portable, that may benefit from the claimed invention.

Now referring to FIG. 3, the computer system 300 according to the exemplary embodiment of the present invention preferably includes a system unit 310, a solar power unit 320, and a battery unit 330.

The system unit 310 receives power from at least one of the solar power unit 320 and the battery unit 330 which is output to an operation power supply terminal 312 to permit the system unit to perform an operation. In this particular case, the system unit 310 may include the operation power supply terminal 312 and a controller 314.

The operation power supply terminal 312 supplies operation power in VDC to the system unit 310 on the basis of solar power which is output from the solar power unit 320 and/or battery power which is output from the battery unit 330. According to one exemplary embodiment, the operation power supply terminal 312 supplies operation power in VDC to the system unit 310 on the basis of both solar power and battery power. Alternatively, the operation power supply terminal 312 supplies operation power the VDC to the system unit 310 on the basis of solar power or battery power.

The controller 314 may control at least one of the solar power unit 320 and/or the battery unit 330 to output battery power and/or solar power to the operation power supply terminal 312.

In detail, the controller 314 controls the solar power unit 320 so that a converter 326 turns on a first transistor 324 if an AC voltage is not input from an adaptor 305 and the solar power unit 320 is enabled, and to turn off the first transistor 324 if an AC voltage is input from the adaptor 305. The adaptor could connect to the converter 326 or to, for example, the operation power supply terminal. A person of ordinary skill in the art understands and appreciates that the adapter 305 may contain a rectifier to convert AC voltage to DC voltage, or for example, the operation power supply terminal 312 may include a rectifier to perform such a conversion. When the first transistor 324 is turned on, solar power is output to the operation power supply terminal 312. When the first transistor 324 is turned off, solar power is not output to the operation power supply terminal 312. The system unit then is powered either by the battery unit 330 or from the AC adaptor 305.

Further, the controller 314 turns on a second transistor 332 if an AC voltage is not input from the adaptor, and it turns off the second transistor 332 if an AC voltage is input from the adaptor 305.

When the second transistor 332 is turned on, battery power is output from the battery cell to the operation power supply terminal 312. When the second transistor 332 is turned off, battery power is not output from the battery cell to the operation power supply terminal 312.

Meanwhile, the controller 314 is provided with power from the solar power unit 320 and the battery unit 330, respectively, according to a predetermined ratio. Such a ratio, for example, may favor solar power as such generation does not require fossil fuels or nuclear reactors. In addition, a maximum amount of time prior to having to charge (or recharge) batteries is typically desirable.

The controller 314 controls charging of the battery unit 330 using power charged in the solar power unit 320 when the computer system 300 is off, or when a load in the system is small.

The solar power unit 320 is provided with feedback on a voltage of the operation power supply terminal 312 and outputs solar power corresponding to a predetermined operational level of the system unit 310 to the operation power supply terminal 312. In this case, the solar power unit 320 may be enabled when being charged with a prescribed voltage or more of solar power. The prescribed voltage may be set variously on a capacity of the capacitor 322 or a user's design.

The solar power unit 320 may be selectively discharged according to a load in the entire system. According to one exemplary embodiment, the solar power unit 320 may be discharged simultaneously with the battery unit 330. In this case, the solar power unit 320 may discharge solar power at the same time with battery power within a range of charged/discharged voltage of battery power. Alternatively, if a load is small in the system, the solar power unit 320 can take charge of a whole load in the system by itself. In this case, the system unit 320 is provided with only solar power.

Meanwhile, the solar power unit 320 may be detached/detachable from the computer system 300.

With continued reference to FIG. 3, in detail, the solar power unit 320 includes the capacitor 322, the first transistor 324 and a converter 326.

The capacitor 322 is charged with voltage generated by solar power which can be up to the capacitance of the capacitor. The capacitor, which was charged by solar power, is discharged and as such outputs voltage to the operation power supply terminal 312.

In this case, the capacitor 322 may be a capacitor 322 with a small capacity. The capacitor 322 may be connected to a solar panel toward a panel of the computer system 300 or arranged in an optimal position.

The first transistor 324 is turned on when an AC voltage is not input from the adaptor 305 and the solar power unit 320 is enabled, and it is turned off when an AC voltage is input from the adaptor 305.

The converter 326 may selectively discharge the solar power used to charge the capacitor 322. Specifically, when an AC voltage is not input from the adaptor but the solar power unit 320 is enabled, the converter 326 turns on the first transistor 324. When an AC voltage is input from the adaptor, the converter 326 turns off the first transistor 324.

The converter 326 may be provided to the panel or to a main body of the computer system 300.

The battery unit 330 outputs battery power to the operation power supply terminal 312. In this case, the battery unit 330 may be mounted in and detached from the system unit 310. When being mounted in the system unit 310, the battery unit 330 is supplied with power from the system unit 310 to be charged or provides power to the system unit 310.

The battery unit 330 preferably includes the second transistor 332 and a battery cell 334.

The second transistor 332 is turned on when an AC voltage is not input from the adaptor 305, and it is turned off when an AC voltage is input from the adaptor 305.

The battery cell 334 may comprise a battery which is charged/discharged by any workable method. For example, a nickel-cadmium battery, a lead storage battery, a nickel-hydrogen battery, a lithium-ion battery, a lithium-polymer battery or lithium-metal battery, a zinc-air storage battery, etc. It is also possible that a contactless battery charging system could be used.

At least one battery cell 334 may be provided. In this case, the at least one battery cell 334 may be connected in series or in parallel to the load.

Meanwhile, the first transistor 324 and the second transistor 332 may comprise a bipolar junction transistor (BJT) or a field effect transistor (FET). These transistors may also be integrated into the controller 314, and said controller may be a microprocessor.

Figure 4:
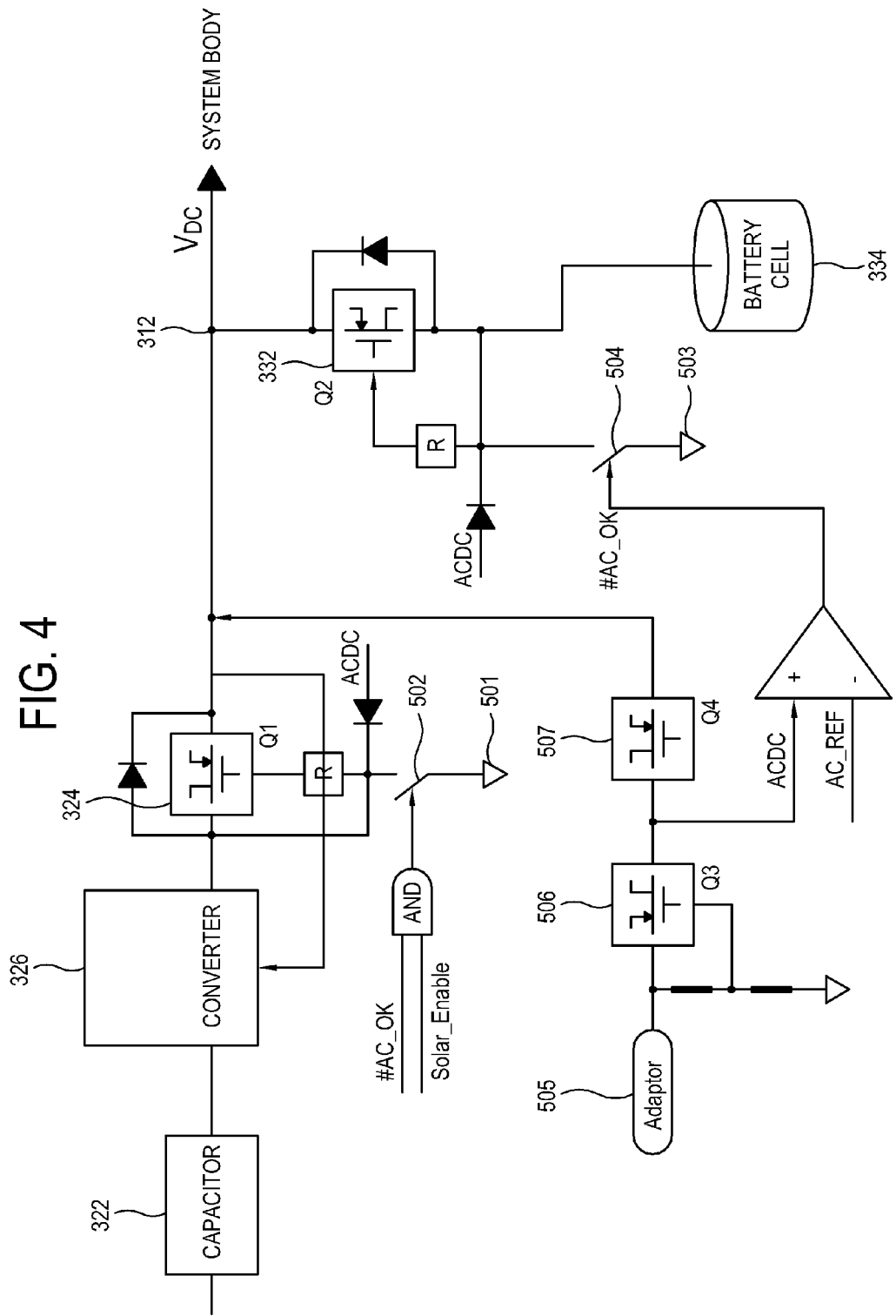
FIG. 4 illustrates a detailed circuit diagram of the computer system according to the exemplary embodiment of the present invention.

FIG. 4 illustrates an example of a detailed circuit diagram of the computer system according to the exemplary embodiment of the present invention.

The computer system 300 according to the exemplary embodiment of the present invention is provided with operation power to operate the computer system overall from at least one of the adaptor 505, the solar power unit 320 and the battery unit 330. In this case, power supplied from the adaptor 505 is an AC current that is commonly used. Power supplied from the solar power unit 320 and the battery unit 330 is a DC current which is auxiliary power replacing commonly used power. The computer system 300 generally uses commonly used power prior to using auxiliary power.

In FIG. 4, when the adaptor 505 is inserted into the computer system 300, an AC current is input via the adaptor 505. When the AC current is input, a third transistor 506 and a fourth transistor 507 are turned on, respectively, and accordingly the AC power input through the adaptor 505 is output to the operation power supply terminal 312 to be provided to the system unit 310. Meanwhile, in this case, the AC power may be converted into a DC power to be output to the operation power supply terminal 312. To this end, the circuit shown in FIG. 4 may further include an AC-DC converter which converts AC power into DC power.

The solar power unit 320 is enabled the capacitor 322 is charged with voltage generated by solar power at a predetermined voltage or a value greater than the predetermined voltage. The predetermined voltage may be set depending on a capacity of the capacitor 322 or a design by a user.

When the solar power unit 320 is enabled and AC power is not input, the solar power unit 320 provides solar-generated power to the system unit 310. In detail, the controller 314 closes a first switch 502. When the first switch 502 is closed, an electric current flows from a ground 501 to turn on the first transistor 324. In this example, solar power charged in the capacitor 322 is output to the operation power supply terminal 312 through the first transistor 324 to be supplied to the system unit 310.

Meanwhile, in order to supply solar-generated power simultaneously with battery power to the system unit 310, the converter 326 is provided with feedback on a voltage of the operation power supply terminal 312 and outputs solar-generated power corresponding to a preset operational level of the system unit 310 to the operation power supply terminal 312. Specifically, the converter 326 outputs solar-generated power in a range of an operational level of the system unit 310 or solar-generated power in a level corresponding to a voltage of battery power. Accordingly, a short circuit in the operation power supply terminal 312 that would likely occur when battery power and solar power are supplied at the same time, may be prevented.

When AC power is not input, the battery unit 330 supplies battery power to the system unit 310. In detail, the controller 314 closes a second switch 504. When the second switch 504 is closed, an electric current flows from a ground 503 to turn on the second transistor 332. In this case, battery power charged in the battery cell 334 is output to the operation power supply terminal 312 through the second transistor 332 to be supplied to the system unit 310.

FIG. 5 illustrates an operation power supplier according to changes in the state of the computer system according to the exemplary embodiment of the present invention.

In a battery mode, the computer system 300 is provided with power charged in the battery unit 330 as operation power. In an adaptor mode, the computer system 300 is provided with AC power input from the adaptor 505 as operation power.

When the adaptor 505 is inserted during a battery mode, the computer system 300 changes over to the adaptor mode. In this case, the computer system 300 uses AC power, which is commonly used, instead of battery power. Thus, the computer system 300 disables the solar power unit 320 upon the change to adaptor mode.

Meanwhile, in FIG. 5, an AC_IN# signal is output in a high state when AC power is input, and it is output in a low state when AC power is not input. Thus, when AC power is input through the adaptor, the AC_IN# signal is changed from a low state to a high state.

Since AC power is input from the adaptor, the first transistor 324 is turned off. Accordingly, solar power supplied from the solar power unit 320 is blocked. Since AC power is input from the adaptor, the second transistor 332 is turned off. Accordingly, battery power supplied from the battery unit 330 is blocked. Thus, when the adaptor 505 is inserted in the battery mode, a source of operation power VDC is the adaptor.

When the adaptor is detached from the computer system 300 while the computer is in the adaptor mode, the computer system 300 changes over to the battery mode. In this case, the computer system 300 uses solar power and/or battery power, which in this case are forms of auxiliary power, instead of AC power that is generally used.

The solar power unit 320 may be enabled when being charged with solar-generated power at least at a predetermined voltage or more. Thus, the solar power unit 320 is disabled until being charged with solar-generated power at the predetermined voltage or more.

Meanwhile, when AC power is not input through the adaptor, the AC_IN# signal is changed from a high state to a low state.

When AC power is not input from the adaptor and the solar power unit 320 is enabled, the first transistor 324 is turned on. In this case, since AC power is not input from the adaptor, the second transistor 332 is also turned on. Accordingly, both solar power and battery power are supplied. Thus, a source of operation power VDC is a solar power converter (i.e., the solar power unit) and the battery.

When AC power is not input from the adaptor and the solar power unit 320 is disabled, the first transistor 324 is turned off. Accordingly, solar-generated power supplied from the solar power unit 320 is blocked. In this case, on the contrary, since AC power is not input from the adaptor, the second transistor 332 is turned on. Accordingly, battery power is supplied from the battery unit 330. Since solar power is blocked and only battery power is supplied, a source of operation power VDC is the battery.

Figure 6:
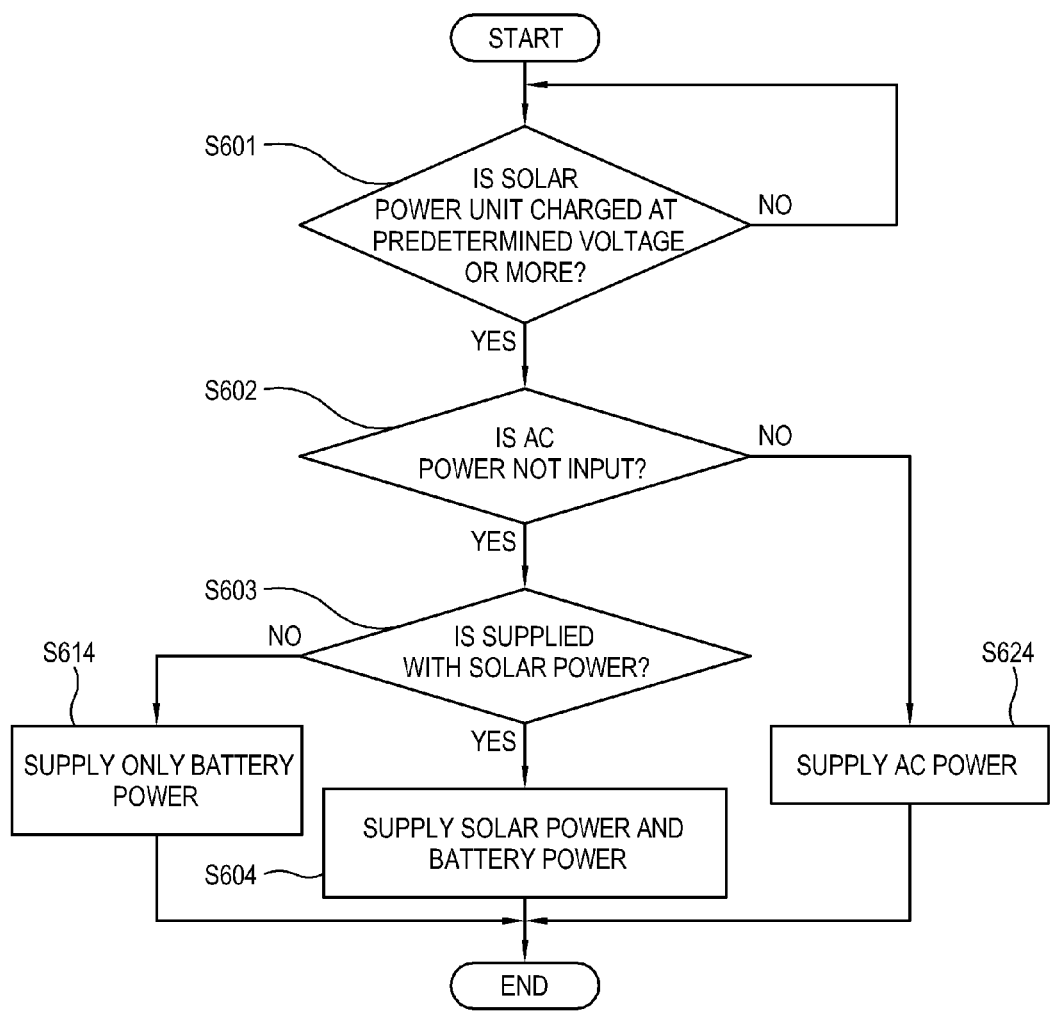
FIG. 6 illustrates a method of controlling the computer system having a solar power unit according to the exemplary embodiment of the present invention.

FIG. 6 illustrates a method of controlling the computer system according to the exemplary embodiment of the present invention.

At step (S601), the computer system 300 determines whether the solar power unit 320 is charged up to at least a predetermined voltage value or higher. The solar power unit 320 may be enabled when being charged with solar-generated power at the predetermined voltage value. The predetermined voltage may be set in accordance with a capacity of the capacitor 322 or a user's design.

If the solar power unit 320 is not charged with the predetermined voltage or more (S601-N), the computer system 300 remains in standby until the solar power unit 320 is charged with at least the predetermined voltage value.

If the solar power unit 320 is charged with the predetermined voltage or more (S601-Y), then at (S602), the computer system 300 determines whether AC power is not input.

If AC power is not input (S602-Y) (there is no AC power), then at (S603) computer system 300 determines whether to be provided with solar power. Specifically, the computer system 300 may determine whether to be supplied with solar power by settings of the system or user's selection.

If it is determined to be supplied with solar power (S603-Y), then at (S604) computer system 300 is supplied with solar power and battery power.

If it is determined there is no supply of solar power (S603-N), then at (S614) computer system 300 is supplied with only battery power.

Meanwhile, if in determining that AC power is input at S602 (S602-N), then at (S624) computer system 300 provides AC power.

Figure 7:
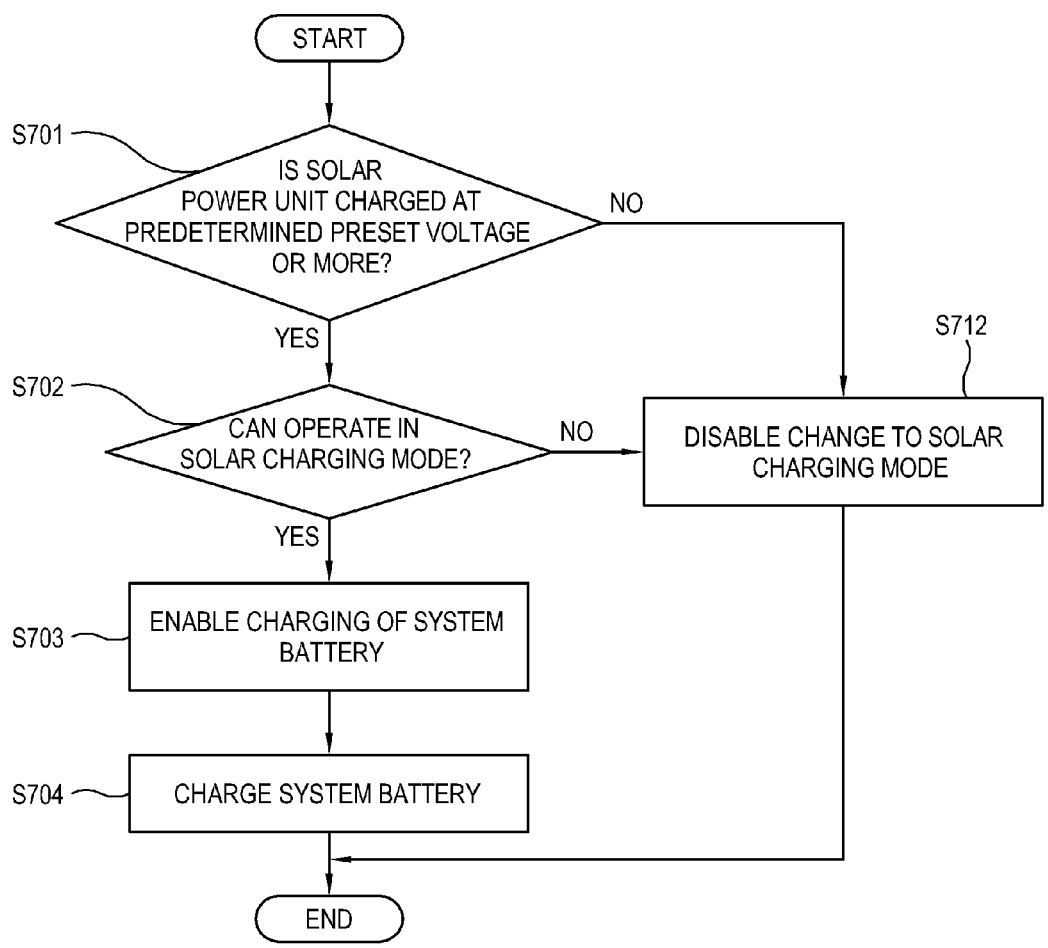
FIG. 7 illustrates a method of controlling a computer system having a solar power unit according to another exemplary embodiment of the present invention.

FIG. 7 illustrates a method of controlling a computer system according to another exemplary embodiment of the present invention.

According to the present exemplary embodiment, when a computer system 300 is turned off or a load in the system is small, a battery unit 330 may be charged using power generated in a solar power unit 320.

At (S701), the computer system 300 determines whether or not the solar power unit 320 is charged up to at least a predetermined voltage or higher. If the solar power unit 320 is not charged up to at least the predetermined voltage or more (S701-N), then at (S712) the computer system 300 disables a change to a solar charging mode.

If at (S701-Y), the solar power unit 320 is charged up to at least the predetermined voltage or higher, then at (S702) the computer system 300 determines whether or not to operate in the solar charging mode. Specifically, when the computer system 300 is input with DC power instead of AC power, i.e., input with power through a battery instead of an adaptor, or when the computer system 300 is off, the computer system 300 may operate in the solar charging mode. If not being able to operate in the solar charging mode (S702-N), the computer system 300 disables a change over to the solar charging mode (S712).

Meanwhile, if changing over to the solar charging mode, even if disabling a change to the solar charging mode, the computer system 300 may display a warning light informing of a danger from such a changeover.

If at (S702-Y) it is determined to be able to operate in the solar charging mode, the computer system 300 enables charging of a system battery (S703).

In this case, energy stored in a charged capacitor 322 is used to charge the system battery of the computer system 300, i.e., a battery unit 330 (S704). When the system battery is fully-charged, a charging process is completed.

Figure 8:
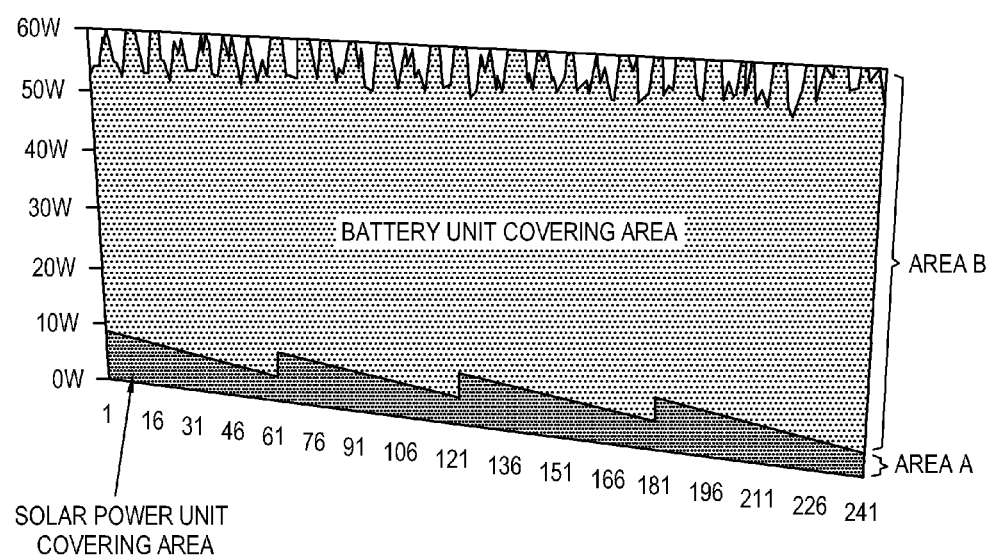
FIG. 8 illustrates a load in the system powered by solar power and battery power provided to the computer system according to the exemplary embodiment of the present invention.

FIG. 8 illustrates a load in the system covered by solar power and battery power provided to the computer system according to the exemplary embodiment of the present invention.

Referring now to FIG. 8, a total load given to the computer system 300 is 60 watt (W) on average.

A load in the system which the solar power unit 320 can cover is in the range from 0 watts to 10 watts, which is about 10 watts (area a). A load in the system which the battery unit 330 can cover is in the range from 10 watts to 60 watts, which is about 50 watts (area b). If battery power uses with solar power in the computer system 300, the battery power is allowed to cover less of a system load than when the battery power is used alone. Thus, the battery power lasts longer.

As described above, the present invention provides a computer system which drives a mobile device through a solar power source using an inexhaustible solar energy unit, thereby contributing to expansion of introducing a solar cell and enhancing utilization of green energy.

Further, a small solar cell is preferably mounted in a mobile device to improve portability and to extend usage time of a battery.

In addition to the cost owing to a battery needed for a solar pack system and a high-performance battery protection device/IC to control the same may be reduced, and a safety problem which may occur when the pack is connected to a system with a higher capacity than the battery may be decreased.

Although a few exemplary embodiments have been shown and described, it will be appreciated by those skilled in the art that many changes may be made in these exemplary embodiments without departing from the principles and spirit of the invention, the scope of which is defined in the appended claims and their equivalents. For example, while it is preferred that unit 322 is a capacitor, other types of storage units for charge can be used.

Furthermore, while the device discussed throughout is a computer system, which can be, for example, a lap-top computer, notebook computer, netbook computer, pad computer, personal digital assistant (PDA), or a mobile terminal, portable game, music player such as MP3, or any device, preferably portable, which can benefit from the present invention as claimed herein.

What is claimed is:

1. A portable device comprising:
   a system unit consuming power as a load of the portable device, and having an operation power supply terminal provided with output power to perform an operation;
   a battery unit providing battery power from a battery to the operation power supply terminal; and
   a solar power unit comprising a storage device and a converter, the converter being provided with feedback on a voltage value of the operation power supply terminal for outputting a solar-generated power corresponding to a predetermined operational level of the system unit to the operation power supply terminal, through selective discharge of the storage device.

2. The portable device according to claim 1, wherein the solar power unit is enabled when the storage device is charged up to at least a predetermined voltage value.

3. The portable device according to claim 1, wherein the storage device comprises a capacitor charged with the solar-generated power.

4. The portable device according to claim 1, further comprising a controller for controlling at least one of the battery unit and the solar power unit to output the battery power and/or the solar-generated power to the operation power supply terminal.

5. The portable device according to claim 4, wherein the solar power unit includes a first transistor, and the controller controls the converter to turn on the first transistor when AC power is not being input from an adaptor and the solar power unit is enabled, and to turn off the first transistor when AC power is being input from the adaptor.

6. The portable device according to claim 5, wherein the battery unit includes a second transistor, and the controller turns on the second transistor when AC power is not being input from an adaptor, and turns off the second transistor when AC power is being input from the adaptor.

7. The portable device according to claim 4, wherein the controller is provided with power from the solar power unit and the battery unit, respectively, according to a predetermined ratio.

8. The portable device according to claim 1, wherein the solar power unit is detachable from the computer system.

9. The portable device according to claim 1, wherein the battery unit is mountable in or detachable from the computer system.

10. The portable device according to claim 1, wherein the computer system comprises at least one of a lap-top computer, notebook computer, netbook computer, pad computer, music player, personal digital assistant (PDA), or a mobile terminal.

11. A method of controlling operating power to a portable device comprising:
   outputting battery power to an operation power supply terminal of a system unit, the system unit consuming power as a load of the portable device;
   feeding back voltage of the operation power supply terminal to a converter of a solar power unit;
   outputting solar-generated power corresponding to a predetermined operational level of the system unit to the operation power supply terminal through selective discharge of a storage device of the solar power unit; and
   providing output power to the operation power supply terminal to perform an operation.

12. The method according to claim 11, comprising outputting the solar-generated power corresponding to the predetermined operational level of the system unit to the operation power supply terminal when the solar power is charged to at least a predetermined voltage value.

13. The method according to claim 11, wherein the storage device is a capacitor.

14. The method according to claim 11, further comprising outputting the battery power and/or the solar-generated power to the operation power supply terminal.

15. The method according to claim 14, comprising outputting the solar-generated power to the operation power supply terminal when AC power is not being input from an adaptor and the solar-generated power is charged up to at least a predetermined voltage or higher, and not outputting the solar-generated power to the operation power supply terminal when AC power is input from the adaptor.

16. The method according to claim 14, comprising outputting the battery power to the operation power supply terminal when AC power is not being input from an adaptor, and not outputting the battery power to the operation power supply terminal when AC power is being input from the adaptor.

17. The method according to claim 14, further comprising providing the operation power supply terminal with the solar-generated power and the battery power, respectively, according to a predetermined ratio.

18. The method according to claim 11, wherein the solar-generated power is input from the solar power unit which is detachable from the computer system.

19. The method according to claim 11, wherein the battery power is being input from the battery unit, and wherein said battery unit is mountable in or detachable from the computer system.

20. The method according to claim 11, wherein the portable device comprises at least one of a lap-top computer, notebook computer, netbook computer, pad computer, music player, personal digital assistant (PDA), or a mobile terminal.

* * * * *